(12) United States Patent
Jahn

(10) Patent No.: US 9,315,157 B2
(45) Date of Patent: Apr. 19, 2016

(54) HOLDING ARRANGEMENT FOR A MOBILE DEVICE, PASSENGER SEAT WITH A HOLDING ARRANGEMENT FOR A MOBILE DEVICE AND VEHICLE

(71) Applicant: Airbus Operations GmbH, Hamburg (DE)

(72) Inventor: Beatrice Jahn, Hamburg (DE)

(73) Assignee: Airbus Operations GmbH (DE)

( * ) Notice: Subject to any disclaimer, the term of this patent is extended or adjusted under 35 U.S.C. 154(b) by 284 days.

(21) Appl. No.: 14/164,365

(22) Filed: Jan. 27, 2014

(65) Prior Publication Data

US 2014/0209648 A1 Jul. 31, 2014

Related U.S. Application Data

(60) Provisional application No. 61/757,763, filed on Jan. 29, 2013.

(30) Foreign Application Priority Data

Jan. 29, 2013 (DE) ...................... 20 2013 100 414 U

(51) Int. Cl.
*B60R 11/00* (2006.01)
*B60R 7/04* (2006.01)
*B60R 11/02* (2006.01)

(52) U.S. Cl.
CPC .................. *B60R 7/043* (2013.01); *B60R 11/02* (2013.01); *B60R 11/0252* (2013.01);
(Continued)

(58) Field of Classification Search
CPC ............ B60R 7/043; B60R 2011/0017; B60R 2011/0276; B60R 11/0252; B60R 2011/0075
USPC ......................................... 224/275, 401, 400
See application file for complete search history.

(56) References Cited

U.S. PATENT DOCUMENTS 5,984,347 A * 11/1999 Blanc-Rosset ......... B60N 3/004
224/275
6,092,705 A * 7/2000 Meritt ..................... B60R 11/02
224/275

(Continued)

FOREIGN PATENT DOCUMENTS

DE 202011105629 U1 10/2011
DE 202011105500 U1 12/2012

(Continued)

OTHER PUBLICATIONS

German Office Action for Application No. 202013100414.6 dated Dec. 18, 2014.

*Primary Examiner* — Justin Larson
*Assistant Examiner* — Lester L Vanterpool
(74) *Attorney, Agent, or Firm* — Lerner, David, Littenberg, Krumholz & Mentlik, LLP

(57) ABSTRACT

A holding arrangement for a mobile device in a cabin of a vehicle has a cabin equipment component, a support device arranged on the cabin equipment component, a holding device for holding a mobile device and a covering pane. The support device is designed to receive the holding device and further has an access opening arranged on a side opposite the cabin equipment component. Furthermore, the support device is designed to slidably hold the covering pane for opening and closing the access opening arranged on the side opposite the cabin equipment component in such a manner that the covering pane is movable to a closed position and to an open position, wherein in its open position the covering pane extends beyond the support device. Hereby, an improved holding function and temporary theft prevention may be accomplished.

12 Claims, 4 Drawing Sheets

(52) U.S. Cl.
CPC  *B60R 2011/0017* (2013.01); *B60R 2011/0075* (2013.01); *B60R 2011/0094* (2013.01); *B60R 2011/0276* (2013.01)

(56) References Cited

U.S. PATENT DOCUMENTS

| | | | | |
|---|---|---|---|---|
| 7,267,402 | B2* | 9/2007 | Chang | B60R 11/0235 297/217.3 |
| 7,762,627 | B2* | 7/2010 | Chang | B60R 11/0235 297/217.1 |
| 8,162,395 | B2* | 4/2012 | Vitito | B60K 35/00 297/217.3 |
| 8,203,657 | B2* | 6/2012 | Vitito | B60K 35/00 297/217.3 |
| 8,210,605 | B2* | 7/2012 | Hough | B60N 2/4876 297/188.05 |
| 2004/0016782 | A1* | 1/2004 | Hsu | B60R 11/0229 224/275 |
| 2006/0022003 | A1* | 2/2006 | Zheng | B60R 11/0235 224/275 |
| 2007/0057541 | A1* | 3/2007 | Huang | B60R 11/0235 297/217.3 |
| 2007/0222248 | A1* | 9/2007 | Maulden | B60N 2/4876 296/37.15 |
| 2007/0290536 | A1* | 12/2007 | Nathan | B60K 35/00 297/217.3 |
| 2008/0157574 | A1* | 7/2008 | LaRussa | B60N 2/4876 297/217.3 |
| 2009/0085383 | A1* | 4/2009 | Hicks | B60K 35/00 297/217.3 |
| 2013/0009460 | A1* | 1/2013 | Speach | B60R 11/02 307/9.1 |

FOREIGN PATENT DOCUMENTS

| | | |
|---|---|---|
| GB | 2486569 A | 6/2012 |
| WO | 2013034296 A2 | 3/2013 |

* cited by examiner

HOLDING ARRANGEMENT FOR A MOBILE DEVICE, PASSENGER SEAT WITH A HOLDING ARRANGEMENT FOR A MOBILE DEVICE AND VEHICLE

CROSS-REFERENCE TO RELATED APPLICATIONS

The present application claims the benefit of the filing date of U.S. Provisional Patent Application No. 61/757,763, filed Jan. 29, 2013, the disclosure of which is hereby incorporated herein by reference.

TECHNICAL FIELD

The invention relates to a holding arrangement for an electronic device, to a passenger seat with a holding arrangement for an electronic device, and to a vehicle with a cabin with at least one holding arrangement positioned therein.

BACKGROUND OF THE INVENTION

In commercial aircraft, for the purpose of entertainment, passengers are regularly provided with displays and an audio connection for headphones. In this arrangement the displays are usually integrated in the backrest of a passenger seat, or alternatively in a partition wall, a swivel arm or some other installations arranged nearby. The functions of the display and of the audio connection are determined during manufacture or during refit of the vehicle; they subsequently have an unchanged function for a substantial period of time. Irrespective of the above, on longer journeys passengers often carry with them mobile electronic devices that can also be used for entertainment. Examples of these include smartphones and tablet PCs, which at present are undergoing rapid technological progress. These devices are already provided by aircraft operators for the duration of the flight, or individual models are already integrated in the seat, wherein no change of model is possible. Passengers hold these handheld mobile devices during use or place them on a storage surface.

Since mobile electronic devices on board vehicles, and in particular on board aircraft, are used predominantly when the journey is relatively long, it often happens that users of the mobile devices are asleep or move about within the cabin. In order to prevent the mobile device from being stolen, users are forced to temporarily stow the devices in their cabin baggage or to take them along with them within the cabin.

BRIEF SUMMARY OF THE INVENTION

It is thus the object of the invention to propose a holding arrangement for a mobile device, which holding arrangement holds a mobile device as securely and reliably as possible, provides adequate protection against theft, and furthermore can be adjusted as easily as possible to various device sizes.

The object is met by a holding arrangement for an electronic device with the characteristics of the independent claim 1. Advantageous embodiments and improvements are stated in the claims that depend on claim 1.

A holding arrangement for a mobile device in a cabin of a vehicle is proposed, which holding arrangement comprises a cabin equipment component, a support device arranged on the cabin equipment component, a holding device for holding a mobile device, and a covering pane. The support device is designed to receive the holding device and further comprises an access opening arranged on a side opposite the cabin equipment component. The support device is designed to slidably hold the covering pane for opening and closing the access opening on the side opposite the cabin equipment component in such a manner that the covering pane is movable to a closed position and to an open position, wherein in its open position the covering pane extends beyond the support device.

It is thus a core idea of the invention to receive mobile electronic devices with a holding device, and to store these devices in a securely installed support device on a cabin equipment component. While the support device is designed, for an extended period of time after its installation to the next disassembly, to serve as a static component that cannot be individually adjusted at short notice, the holding device is easily adjustable to the respective mobile device or is very easily exchangeable. Any direct access to the held device can be prevented by means of the covering pane, wherein, furthermore, adequate security is provided to prevent the device from falling out.

The cabin equipment component on which the support device is affixable may be designed in various ways, wherein the design depends on the position of the respective passenger seat and on the design of the cabin of the vehicle. In a classical arrangement of several seat rows distributed along the length of the cabin, with only a few exceptions a backrest of a seat exists in front of every passenger seat, which backrest may receive the support device. Furthermore, several partition walls or monuments may also be used for installation of the support device.

The covering pane is to be considered a component that is preferably planar in design, which component may be slid into the support device in such a manner that in a closed position the device is covered by the covering pane so that the access opening is covered by the covering pane, and the mobile device is, if at all possible, no longer accessible from any side of the support device.

Guiding the covering pane to a closed position may prevent the mobile device falling from the holding device and subsequently from the support device, for example during vibration experienced in operation, or as a result of intermittent acceleration forces. In an aircraft it would, for example, suggest itself to move the covering pane to a closed position during takeoff, landing and when turbulence is encountered. For visual inspection of the closed position by a vehicle attendant, it is useful if the covering pane projects beyond the support device. For example, if the support device is attached to a backrest of a seat, the covering pane may project beyond said support device so that it is easily seen from an aisle in the vehicle by a vehicle attendant. In particular during operational phases of the vehicle in which the use of the mobile device is not permitted it is thus easy to intervene.

Closing the covering pane may, furthermore, result in at least temporary protection against theft of the mobile device, because, in particular, removal of the mobile device is associated with a certain effort. This effort could additionally be increased in that after insertion of the mobile device situated in the holding device into the support device, the covering pane may be clicked into the support device so that the covering pane cannot easily be completely removed from the support device.

Overall, the holding arrangement according to the invention for mobile devices is very advantageous because apart from the simple, reliable and secure holding of mobile devices, at the same time protection against theft is provided. As a result of separation into several components, by means of targeted adjustment of the holding device practically any desired mobile device may be catered for. The holding arrangement is thus future-proof.

Furthermore, it is advantageous that it is not the mobile devices that have to be certified for use within the vehicle, but instead, because of the advantageous holding device, only certification of the holding arrangement is required. This provides the operator of the vehicle with a very high degree of flexibility.

An advantageous embodiment of the holding device further comprises a planar retaining frame that is insertable between the holding device and the covering pane and that comprises an opening with an opening contour, which opening is arranged in a plane of extension and is dimensioned so that a mobile device arranged in the holding device cannot be removed through the access opening. In particular for permanent installation of the mobile device by the operator of the vehicle, the retaining frame may provide permanent protection against theft. It is imaginable to firmly fasten the retaining frame in a slid-in state to the holding device by means of positive-locking or non-positive-locking connecting elements, for example by means of screws that furthermore comprise unusual tool receiving profiles.

In an advantageous embodiment the holding device comprises an elastic foamed material. In this arrangement the holding device may make it possible in a positive-locking or non-positive-locking manner to receive mobile devices that furthermore as a result of the elastic foamed material are very well protected from damage to electronic components as a result of vibration. Furthermore, the surface of the housing is protected from being scratched, wherein in particular in the case of polished metallic surfaces such scratches would result in annoyance or a loss in value. Moreover, with the use of foamed material it is particularly easy to take into account the corporate identity of the vehicle operator by coloring the foamed material in corporate colors, and/or by means of corresponding print.

Because of the low density of the foamed material the realization of relatively large-volume holding devices becomes possible that as a solid material with a recess suitable for the mobile device could be slidable into the support device in the manner of drawers. By slightly exceeding the external dimensions of the holding device with reference to the support device a permanently flush connection between the holding device and the support device may be ensured because the material of the holding device compresses when inserted into the support device and then exerts a counterforce on the receiving surfaces of the support device.

In an advantageous embodiment the covering pane is transparent at least in some regions. In the case of a covering pane that is in a closed position it is nevertheless possible for a user to see the mobile device. While in this arrangement any operation by way of a touch screen or the like is largely excluded, the device could nevertheless play a film.

In an advantageous embodiment the holding device comprises at least one cutout for receiving a power supply cable with a connector. Directly within the holding device the mobile device may be connected to an on-board power supply in order to ensure uninterrupted use. The shape and position of the cutout matches the particular model of the mobile device used.

The holding device preferably comprises a cutout that leads from a first side of the holding device to a second side of the holding device, wherein the first side and the second side are arranged so as to be opposite one another and wherein the cutout between the first side and the second side comprises at least one projection for holding the mobile device. The mobile device may be placed in the holding device, for example on the first side, so that between the first side and the second side it rests against the at least one projection. The holding device may subsequently be inserted into the support device in such a manner that the at least one projection is arranged between the access opening and the mobile device. In this arrangement, even with the covering pane open and without the retaining frame, the device cannot fall from the holding arrangement. Preferably, the display faces the access opening, wherein the projection may comprise a shape that corresponds to that of a display frame. In this arrangement any display elements arranged outside the display should be taken into account.

Furthermore, on a side facing the support device the covering pane may comprise at least one marking device that, in particular in the case of inadequate illumination, visually identifies the position of the covering pane. For example, reflective or fluorescent stickers suggest themselves.

In a furthermore advantageous embodiment the support device is designed as a housing with a fastening surface and an insertion opening for the holding device, wherein the fastening surface is located on a side facing away from the access opening, and wherein the housing is closed between the fastening surface, the access opening and the insertion opening in order to improve security in the vehicle, because in an inserted state of the holding device the mobile device is enclosed all round.

The invention further relates to a passenger seat with a backrest, which seat comprises a holding arrangement as stated above on the back of the backrest.

The invention furthermore relates to a vehicle with a cabin and cabin equipment components, wherein at least one cabin equipment component comprises a holding arrangement according to the invention. In a preferred embodiment at least one cabin equipment component is designed as a passenger seat with a backrest that at the back comprises the holding arrangement. The vehicle is preferably an aircraft.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1:
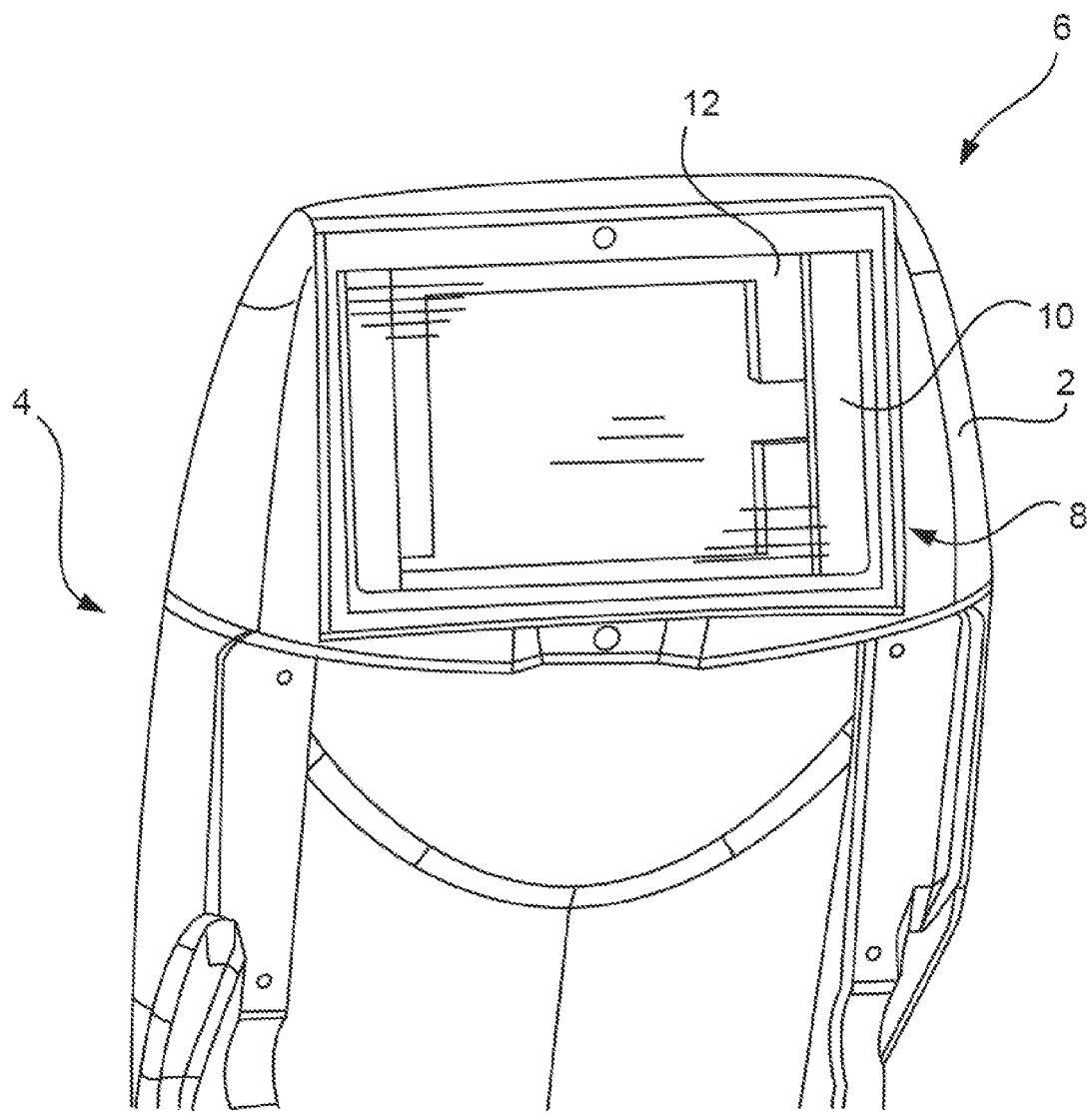
FIG. 1 shows a holding arrangement for an electronic device in a closed position.

FIG. 1 shows a three-dimensional view of a part of a backrest 2 of a passenger seat 4 that forms a holding arrangement 6 for a mobile device in a cabin of a vehicle. This includes a support device 8 arranged on the passenger seat 4, with a holding device 10 for holding a mobile device having been placed in said support device 8. A covering pane 12, in FIG. 1 shown to be partly transparent, fully covers the holding device 10 and is arranged in the support device 8. The support device 8 is arranged at the top of the backrest 6 so that a mobile device arranged therein is easily visible from a passenger seat behind the passenger seat 4.

Because of the customary width of a passenger seat 4 the support device 8 has a relatively generous amount of space available so that it may receive a holding device 10 that may receive mobile devices of many different sizes. Apart from smartphones or similar devices without telephony function, which are considerably less wide than the available width, it is also possible to use larger-sized tablet PCs.

The use of a folding table (not shown in FIG. 1) on the passenger seat 4 is not influenced by the arrangement of the support device on the backrest 2. The use of an electronic device brought along by a passenger is correspondingly not interrupted when meals are served on board.

Figure 2:
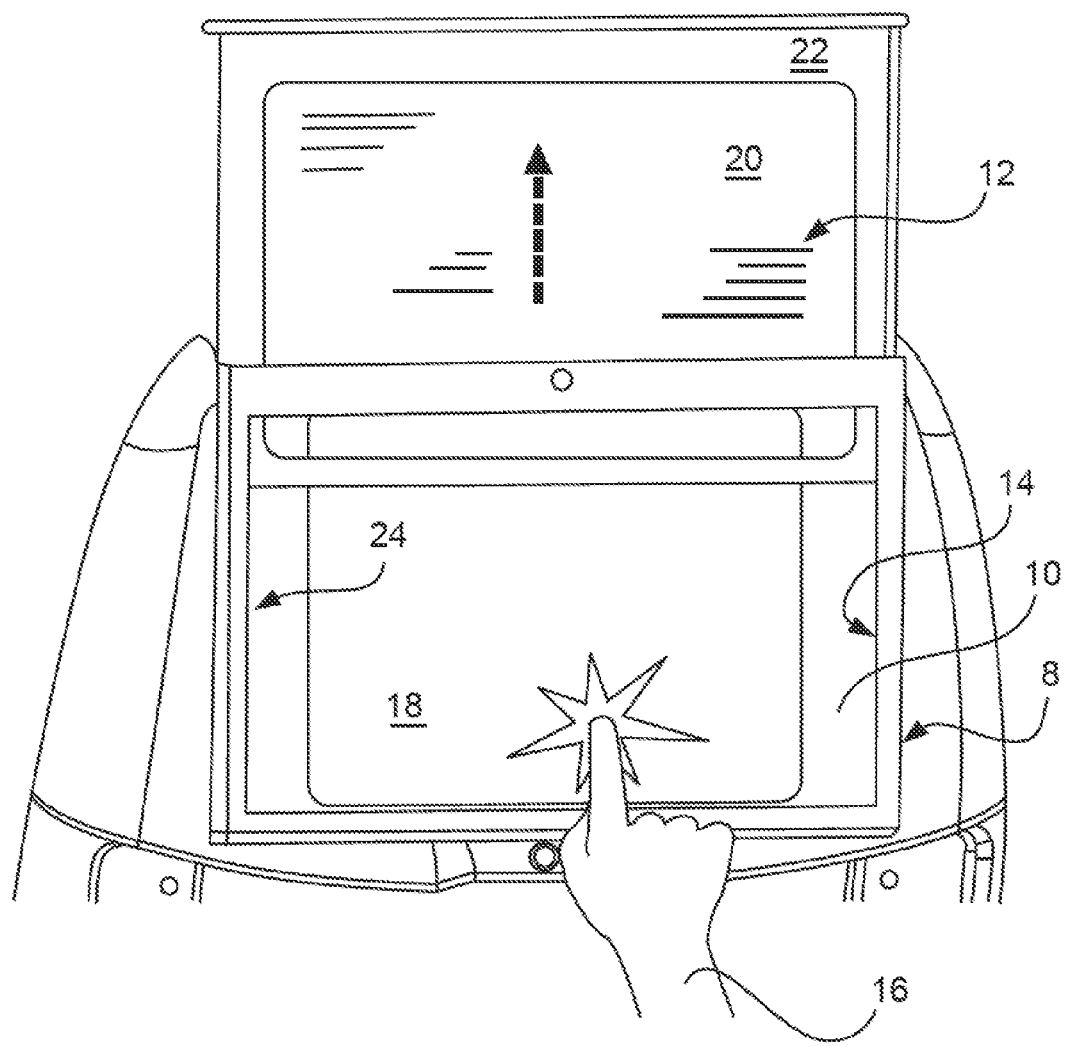
FIG. 2 shows a holding arrangement in an open position.

As shown in FIG. 2, the support device 8 comprises an access opening 14 that is arranged on a side of the support device 8, which side is opposite the passenger seat 4 or the backrest 2. Through the access opening 14 it is possible for a user 16 to operate an electronic device 18 arranged in the holding device 10. In order to release the access opening 14 the covering pane 12 may be slid within the support device 8 in such a manner that it clearly extends beyond the support device 8. For example the covering pane 12 is designed so as to be transparent in some region so that a type of window 20 is arranged in a frame 22, wherein the frame 22 comprises bearing means 24 that slidably hold the covering pane 12. In the simplest case the bearing means 24 are designed as slits, indentations, slide guides or the like.

The extension of the covering pane 12 beyond the bearing means 8 is advantageous in particular in the arrangement in a passenger seat 4, because a vehicle attendant may easily monitor who is using an electronic device 18 in the cabin, without said vehicle attendant having to individually check each passenger seat 4. The exposed position of the covering pane may thus be seen directly from an aisle within the passenger cabin.

Since the covering pane 12 is transparent in some regions, visual information may still be seen with the covering pane 12 slid down, while the device 18 is nevertheless fully encapsulated between the passenger seat 4, the support device 8 and the covering pane 12 so that in the case of strong vibration or in critical driving maneuvers or flight maneuvers there is no danger to passengers in a passenger cabin. Such encapsulation further obviates the need to certify each device 18 individually for use in a respective vehicle by certification tests; instead it is sufficient to have the holding arrangement 6 itself certified.

Encapsulation further provides protection against theft in a passenger cabin, because already prior to the vehicle starting to operate, the device 18 to be used may be placed into a holding device 10, for example by members of the cabin crew in the vehicle. Placement could, for example, involve the complete opening or removal of the covering pane 12 by means of a key or a corresponding tool so that the holding device 10 with a device 18 in place may be put in place or removed. For this purpose the use of a socket or an insert socket driver is imaginable that makes it possible to fully unlock the covering pane 12.

Furthermore, it is imaginable to permit unlocking of the covering pane 12 only during certain phases of operation of the vehicle, wherein such unlocking may also be electrically controlled. In this case it would be possible, for example, after boarding the vehicle to place an electronic device 18 into a holding device 10 and to plug said holding device 10 followed by the covering pane 12 into the support device 8. The covering pane 12 may preferably be designed so that when it has reached a particular point it locks into place, by overcoming a lock-in position, in such a manner that the covering pane 12 may be pulled out only into a closed position or may be pulled from the support device 8 only to a particular point. When the vehicle has ceased operating, when the passengers may leave the vehicle, it would be possible to electrically unlock this locking mechanism so that the covering pane 12 and the holding device 10 may be fully removed again.

Figure 3:
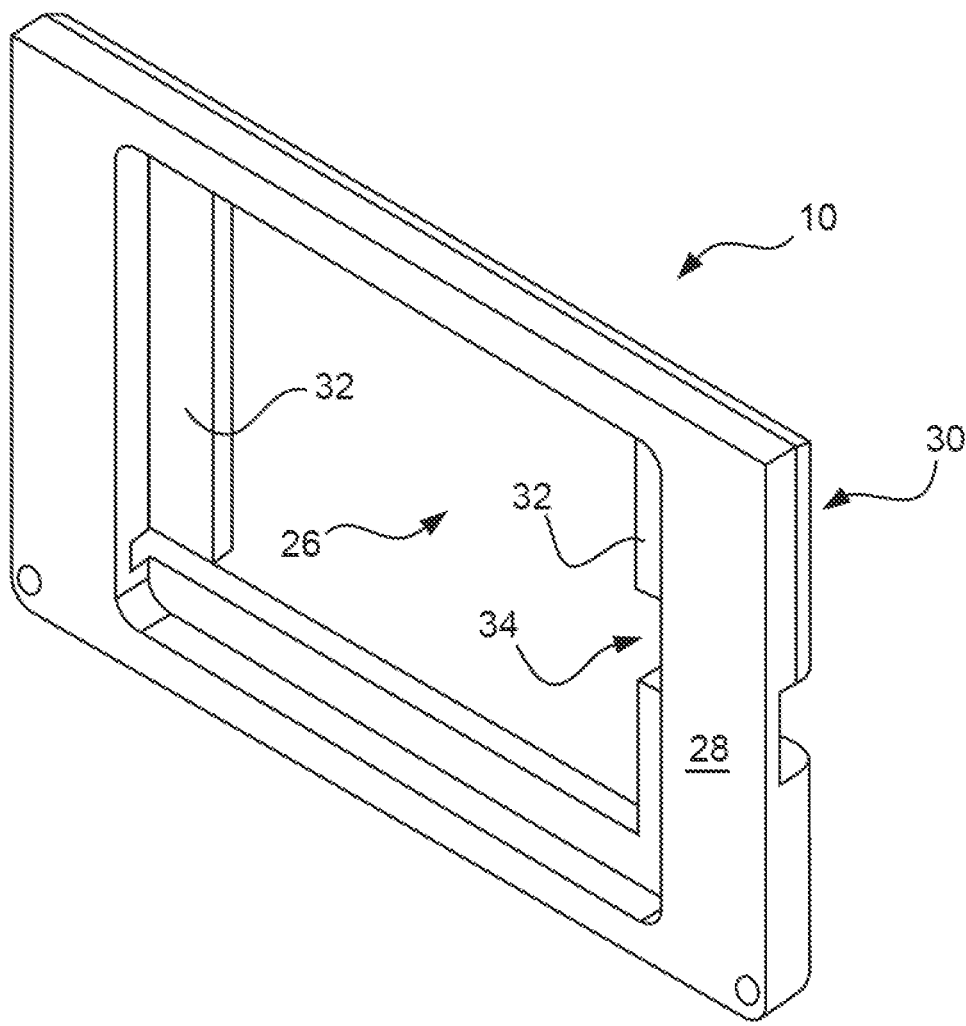
FIG. 3 shows a holding device into which an electronic device may be placed.

FIG. 3 finally shows an exemplary embodiment of a holding device 10 made from an elastic foamed material. The holding device 10 comprises a cutout 26 that extends from a first side 28 of the holding device to a second side 30 of the holding device 10. Between these two sides 28 and 30 there are a number of projections 32 against which the device 18 may be placed. Preferably, the holding device 10 is then inserted in the support device 8 in such a manner that the second side 30 faces away from the cabin equipment component, in other words from the passenger seat 4. The electronic device 18 should then be placed so that the display frame is placed on the projections 32 in such a manner that it is flush. In this way, with corresponding dimensioning of the projections 32, the display of the electronic device 18 is visible in its entirety, but removal of the electronic device 18 from the access opening 14 with the covering pane slid up is not possible.

For arranging a connector and a power supply cable the holding device 10 comprises a cutout 34 that is adequate for space-saving accommodation and connection of a power supply cable. In addition, placing an adapter into this cutout 34 is imaginable, which adapter may inductively be aligned to be flush with a coil arranged on the support device 8 so that when the holding device 10 is slid into place the supply of power is automatically achieved without there being a danger of a cable becoming entangled.

Since the holding device 10 is made from an economical elastic foamed material, very economical production of a multitude of holding devices 10 may take place, which holding devices 10 are designed to match devices that are in widespread use. Thus, overall, the holding arrangement is compact, economical, of lightweight construction, and significantly enhances on-board passenger comfort.

Figure 4:
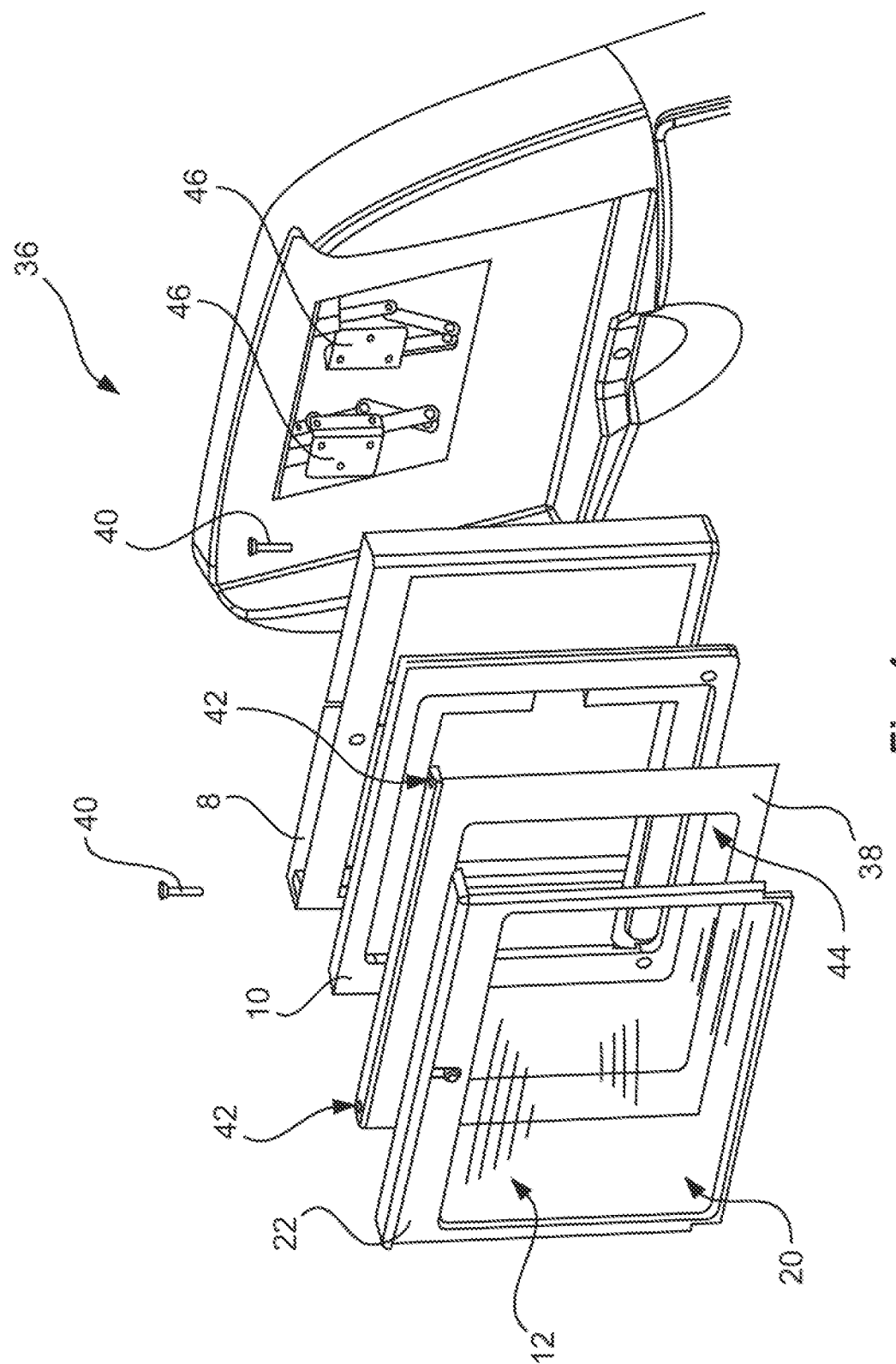
FIG. 4 shows a disaggregated component drawing of an expanded embodiment of a holding device.

FIG. 4 shows a holding arrangement 36 for a mobile device in a cabin of a vehicle, which holding arrangement 36 differs from the holding arrangement 6 of the previous figures in that it provides a retaining frame 38. The holding device 10, together with a mobile device placed therein, may be inserted into the support device 8, wherein from a side of the support device 8, which side faces away from the passenger seat 4, the retaining frame 38 and the covering pane 12 adjoin.

The retaining frame 38 comprises an opening 44 whose external contour is designed in such a manner that the retaining frame 38 firmly holds the mobile device in the holding device 10, thus securing it against falling out or removal. The dimensions of the contour are thus to be constructed so as to be smaller than the dimensions of the mobile device. Even with the covering pane 12 pulled out it is not possible to remove the mobile device directly from the holding device 10.

This holding arrangement 36 suggests itself in particular in the case of a fixed installation of a mobile device in a vehicle cabin, wherein, in order to achieve permanent protection against theft, the retaining frame 38 could, for example, be screwed to the support device 8 by way of corresponding through-holes 42 in the retaining frame 38. To further improve protection against theft, the screws 40 preferably comprise tool receiving profiles that do not correspond to the commonly-used tool profiles. The holding arrangement 36 thus allows unrestricted use of the mobile device with the covering pane 12 in its slid-up or down position.

The disaggregated component drawing in FIG. 4 further shows a receiving device 46 for holding the support device 8 that allows an angle-adjustable position of the holding arrangement 36. Of course, such a receiving device 46 may also be used for a holding arrangement 6 from FIGS. 1 to 3.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

The invention claimed is:

1. A holding arrangement for a mobile device in a cabin of a vehicle, comprising:
   a cabin equipment component,
   a support device arranged on the cabin equipment component,
   a holding device for holding a mobile device, and
   a covering pane,
   wherein the support device is designed to receive the holding device and further comprises an access opening arranged on a side opposite the cabin equipment component, and
   wherein the support device is designed to slidably hold the covering pane for opening and closing the access opening arranged on the side opposite the cabin equipment component in such a manner that the covering pane is movable to a closed position and to an open position, wherein in its open position the covering pane extends beyond the support device.

2. The holding arrangement of claim 1, further comprising a planar retaining frame that is insertable between the holding device and the covering pane and that comprises an opening with an opening contour, which opening is arranged in a plane of extension and is dimensioned so that a mobile device arranged in the holding device cannot be removed through the access opening.

3. The holding arrangement of claim 1, wherein the holding device is made from an elastic foamed material.

4. The holding arrangement of claim 1, wherein the covering pane is transparent at least in some regions.

5. The holding arrangement of claim 1, wherein the holding device comprises at least one cutout for receiving a power supply cable with a connector.

6. The holding arrangement of claim 1,
   wherein the holding device comprises a cutout that leads from a first side of the holding device to a second side of the holding device,
   wherein the first side and the second side are arranged so as to be opposite one another, and
   wherein the cutout between the first side and the second side comprises at least one projection for holding the mobile device.

7. The holding arrangement of claim 1, wherein on a side facing the support device the covering pane comprises at least one marking device.

8. The holding arrangement of claim 1,
   wherein the support device is designed as a housing with a fastening surface and an insertion opening for the holding device,
   wherein the fastening surface is located on a side facing away from the access opening, and
   wherein the housing is closed between the fastening surface, the access opening and the insertion opening.

9. A passenger seat comprising a backrestand a holding arrangement arranged on a back portion of the backrest, the holding arrangement comprising a support device, a holding device for holding a mobile device, and a covering pane, wherein the support device is designed to receive the holding device and further comprises an access opening, and wherein the support device is designed to slidably hold the covering pane for opening and closing the access opening in such a manner that the covering pane is movable to a closed position and to an open position, wherein in its open position, the covering pan extends beyond the support device.

10. A vehicle with a cabin and cabin equipment components, wherein at least one cabin equipment component comprises a holding arrangement, the holding arrangement comprising:
    a support device arranged on the cabin equipment component,
    a holding device for holding a mobile device, and
    a covering pane,
    wherein the support device is designed to receive the holding device and further comprises an access opening arranged on a side opposite the cabin equipment component, and
    wherein the support device is designed to slidably hold the covering pane for opening and closing the access opening arranged on the side opposite the cabin equipment component in such a manner that the covering pane is movable to a closed position and to an open position, wherein in its open position the covering pane extends beyond the support device.

11. The vehicle of claim 10, wherein at least one cabin equipment component is designed as a passenger seat with a backrest having a back that accommodates the holding arrangement.

12. The vehicle of claim 10, wherein the vehicle is an aircraft.

* * * * *